UNITED STATES PATENT OFFICE.

HENRY W. BRADLEY, OF BINGHAMTON, NEW YORK.

IMPROVEMENT IN COMPOUNDS FOR CULINARY USE.

Specification forming part of Letters Patent No. 110,626, dated January 3, 1871.

*To all whom it may concern:*

Be it known that I, HENRY W. BRADLEY, of the city of Binghamton, in the county of Broome and State of New York, have invented a new and Improved Lard or Shortening for Culinary Use; and I do hereby declare that the following is a full, clear, and exact description thereof, which will enable others skilled in the art to make and use the same.

This invention relates to a new composition for lard, butter, or shortening, whereby a very cheap, consistent, and coagulate lard or butter is manufactured, and one superior to ordinary shortening, answering the purpose of lard, butter, or cream for culinary and other uses or purposes.

This invention consists in the application of such ingredients to refined vegetable or fixed oils that the same is changed into a coagulate or consistent state.

My lard or shortening is composed of the following ingredients, in about the following proportions to twelve parts in weight: Beef or mutton suet, (tallow,) three parts; refined vegetable or fixed oils, seven parts; hog's lard, (stearine,) two parts=twelve parts. In a suitable vessel or tank I place six parts of water, to which I add the above ingredients—suet, oil, and lard. The mass is then agitated, washed, and heated for one hour by means of steam injected into the vessel or tank through pipes from an ordinary steam-boiler.

Having thus described my method, I do not thereby intend to confine myself to the use of steam alone, as the ordinary method of boiling and heating may be used. After being agitated for the specified time the steam or heat is removed, and, the water separating from the mass, the oil is drawn off into suitable vessels or packages and allowed to cool. It is then ready for use.

Having thus described my invention, I claim as new and desire to secure by Letters Patent—

As a new and improved article of manufacture, a lard, vegetable butter, or shortening, which is composed of the ingredients, or their respective equivalents, in the proportions herein set forth.

The above specification of my invention signed by me this 20th day of April, 1870.

H. W. BRADLEY.

Witnesses:
 W. E. ALLEN,
 SAML. J. DRAKE.